United States Patent [19]

Friedland

[11] 4,255,054
[45] Mar. 10, 1981

[54] LOCK-IN CONTROL SYSTEM FOR SPRING SUSPENDED RING LASER GYROSCOPE

[75] Inventor: Bernard Friedland, West Orange, N.J.

[73] Assignee: The Singer Company, Little Falls, N.J.

[21] Appl. No.: 22,549

[22] Filed: Mar. 21, 1979

[51] Int. Cl.³ .............................................. G01C 19/64
[52] U.S. Cl. .................................................. 356/350
[58] Field of Search ............................... 356/350, 351

[56] References Cited
U.S. PATENT DOCUMENTS 4,132,482   1/1979   Friedland ........................... 356/350

Primary Examiner—Vincent P. McGraw
Attorney, Agent, or Firm—John C. Altmiller; Thomas W. Kennedy

[57] ABSTRACT

A system for cancelling lock-in in a spring suspended ring laser gyroscope by dithering it at a rate which is a function of measured optical phase and dither rate.

5 Claims, 4 Drawing Figures

4,255,054

LOCK-IN CONTROL SYSTEM FOR SPRING SUSPENDED RING LASER GYROSCOPE

BACKGROUND OF THE INVENTION

1. Field of the Invention

This invention relates to spring suspended ring laser gyroscopes and, more particularly, to an improved method of producing dither in such a gyroscope through the use of feedback.

2. Description of the Prior Art

A variety of types of ring laser gyroscopes have been developed. Typical is the apparatus disclosed in U.S. Pat. No. 3,373,650 where a ring laser gyroscope is shown which employs monochromatic beams of light traveling in two opposite directions around a closed loop path about the axis of rotation. Rotation of the apparatus about the axis of rotation causes the effective path length for each beam to change and results in oscillation at different frequencies in the beams since the frequency of oscillation of a laser depends upon the length of a lasing path. The two waves may be combined to generate interference patterns from which a measure of the rotational rate about the axis can be obtained. As was explained in this patent, the difference in frequency between the two beams at low rotational rates is small and they tend to resonate together, or to "lock-in", and oscillate at only one frequency. Therefore, low rotation rates cannot be detected. In U.S. Pat. No. 3,373,650, this problem is overcome by oscillating or "dithering" the apparatus to avoid lock-in of the two beams. Another structure of this kind is disclosed in U.S. Pat. No. 3,467,472 and a detailed explanation of the problem and the various solutions proposed thereto is contained in U.S. Pat. No. 3,879,130. The latter patent takes a different approach to the problem and describes the use of a saturable absorber placed in the ring laser cavity as a solution to the problem. The dither systems described above are mechanical in nature and in them operation has been "open loop". An improved system, employing feedback, is described in U.S. Pat. No. 4,132,482. This system, while successful to a large degree in reducing the amount of residual lock-in remaining in the system and producing less error than the open loop dithering systems described above, has the disadvantage that it cannot be used with a spring suspension system such as that shown in U.S. Pat. No. 3,373,650. Such systems usually are high Q in order to maintain the amplitude of the dither without using much energy. When feedback is used, the torquer would have to supply an inordinately large amount of power in order to force a change in the dither frequency established by the torsion spring and the inertia of the gyroscope.

SUMMARY OF THE INVENTION

The present invention overcomes the problem outlined above through the use of a dynamic feedback system operating between the output of the ring laser gyro and the dither rate input. For this purpose, a dither signal is generated which cancels the lock-in term by feedback of measured angle and dither rate. Thus, the input to a torquer is controlled by means of a feedback system, the inputs of which are derived from the gyro optical phase angle and the dither angular velocity. These quantities are fed to a feedback control unit which controls the angular acceleration of the spring suspension. The control unit can be constructed using analog or digital components. This invention has advantage over gyroscopes described above in that the residual errors due to lock-in effects are much smaller.

DETAILED DESCRIPTION OF THE INVENTION

Figure 1:
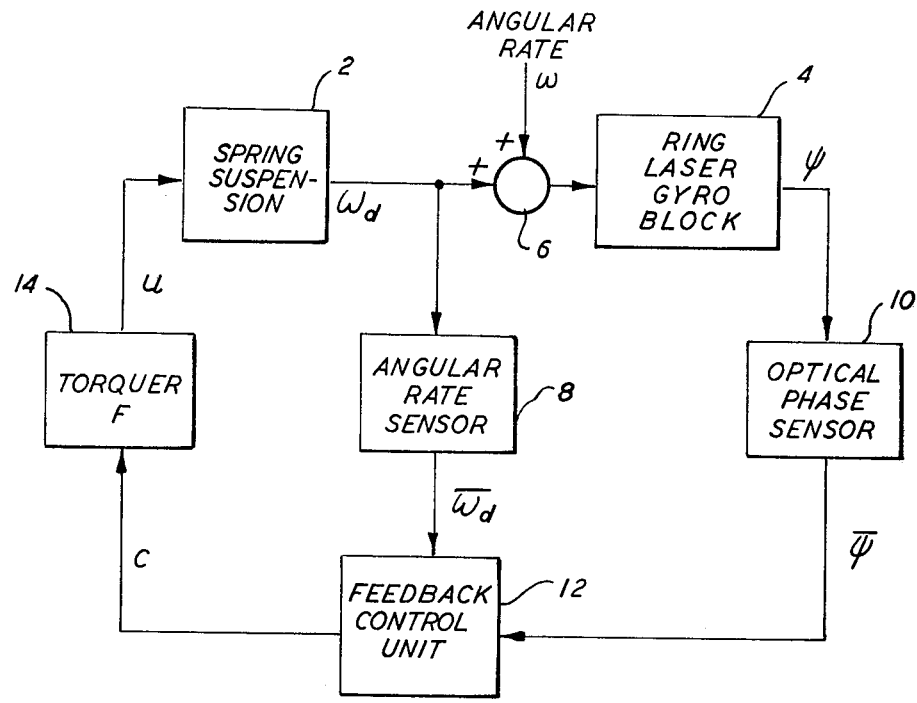
FIG. 1 is a block diagram of a feedback circuit for eliminating lock-in in accordance with the teachings of the invention.

An essential feature of the invention is the control of the input to a torquer, used to dither a spring suspended gyroscope, by means of a feedback system having inputs derived from the optical phase angle $\psi$ and the dither angular velocity $\overline{\omega_d}$. The general configuration of the system is shown in FIG. 1, where the dither rate $\overline{\omega_d}$ produced by a spring suspension 2 of a ring laser gyro block 4 and the input angular velocity $\omega$ are shown interconnected in summing junction 6. The dither rate $\overline{\omega_d}$ is measured by an angular rate sensor 8. The external angular velocity is actually a mechanical input to a ring laser gyro block 4, but its effect is represented for analytical purposes as being an input to a summing junction, as will be understood by those skilled in the art. The optical phase $\overline{\psi}$, which in an ideal gyro is proportional to the mechanical angle $\phi$ through which the gyro block rotates, is measured by a pickoff 10, which may be an optical pickoff, the electrical output of which is designated $\overline{\psi}$ and is approximately equal to $\psi$. The dither rate, as measured by angular rate sensor 8, which may be a tachometer or a piezo-electric transducer, is an electrical signal $\overline{\omega_d}$ which is approximately equal to the actual rate $\omega_d$. The measured optical phase $\overline{\psi}$ and the measured dither rate $\overline{\psi_d}$ are fed as electrical signals to feedback control unit 12 which generates a control signal c which, in turn, is supplied to torquer 14. Torquer 14 is mechanically coupled to spring suspension 2 and supplies an angular acceleration u to the suspension in response to control signal c.

The angular acceleration u produced by the torquer obeys the following mathematical equation:

$$u = -k[\overline{\omega_d} + \omega_L \sin \overline{\psi}] + D\overline{\omega_d} \qquad (1)$$

The output signal is $$c = u/F$$

where
 F is the torquer scale factor,
 D is the damping factor of the suspension system,
 $\overline{\omega_L}$ is the lock-in frequency,
 k is a gain, and
 $\overline{\psi}$ is the measured optical phase.

The gain k is made large enough to minimize the residual lock-in effect, but small enough to result in torques which can be produced by the torquer.

Figure 2:
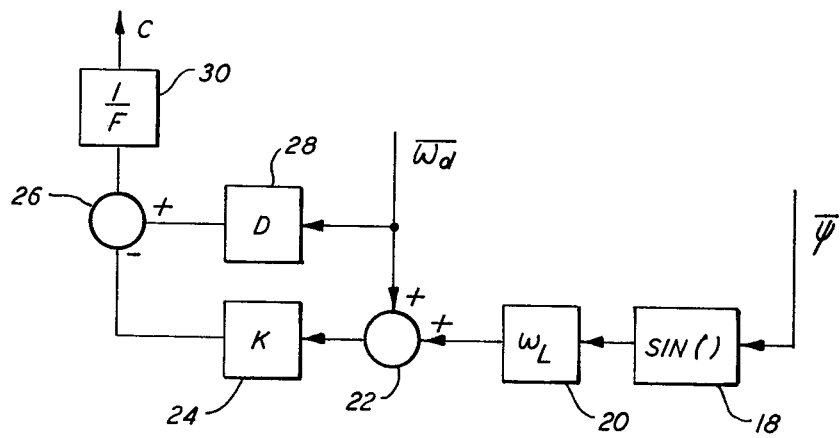
FIG. 2 is a block diagram of a circuit useful for the feedback control unit of FIG. 1.

Such a result is obtainable with the feedback control unit shown in FIG. 2. Therein, the signal representing optical phase $\overline{\psi}$ is provided as an input to a non-linear function generator 18 whose output is the sine of its input. Any of various generators known in the art may be used for this purpose, such as an operational amplifier function generator or a read-only memory arrangement where the analog signal output of a multiplier, converted to a digital signal and fed to the read-only memory, generates an output which is then converted back to an analog signal. The result, which will be sin $\phi$, is the multiplied by the quantity $\omega_L$ in multiplier 20 which may be a properly scaled operational amplifier. The resulting output is then added in summing junction 2 to the output $\omega_d$ of angular rate sensor 8. The total, $\overline{\omega_d} + \omega_L \sin \overline{\psi}$, is fed to inverting amplifier 24 which has a gain k. The output of amplifier 24 is fed to summing junction 26 where it is combined with the output of multiplier 28 and fed to multiplier 30 where it is multiplied by the inverse of the torquer scale factor F, 1/F. The resulting quantity c is fed, as shown in FIG.1, to torquer 14. Summing junction 26 is also fed with the product of the best approximation of the dither rate $\overline{\omega_d}$ times D, the damping factor of the suspension system. This last operation provides the last term of equation (1).

Figure 3:
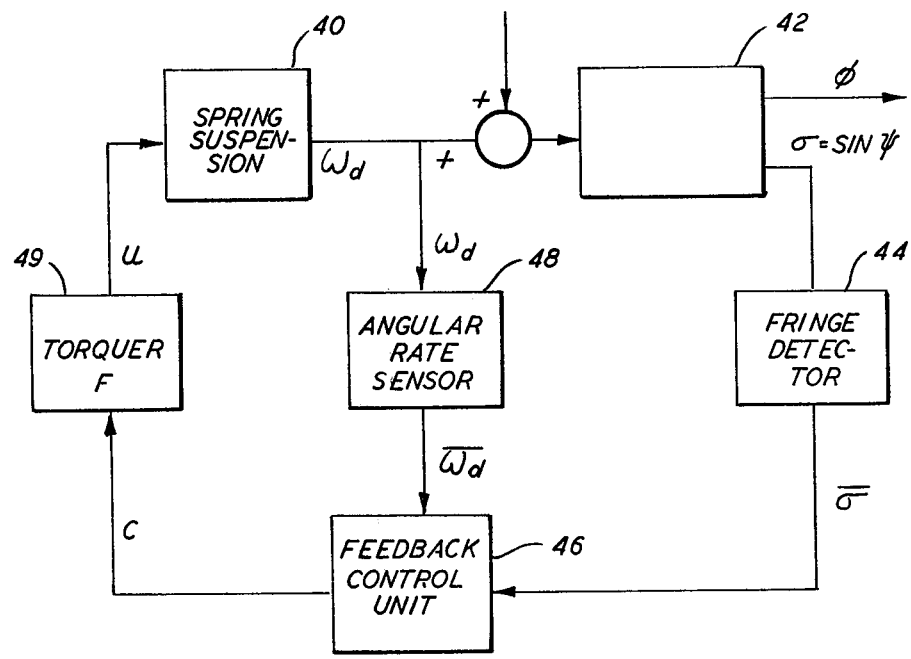
FIG. 3 is a block diagram of an alternative feedback circuit to that of FIG. 1.
Figure 4:
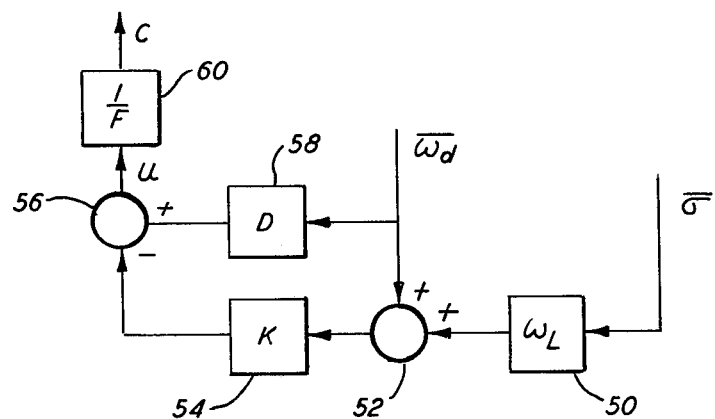
FIG. 4 illustrates a feedback control unit useful in the circuit of FIG. 3.

The alternate embodiment of FIGS. 3 and 4 illustrates the use of the principles of the invention in a ring laser gyro having an output electrical signal $\sigma$ which is equal to the sine of the optical angle $\psi$. Such a signal is conveniently available in a "fringe detector" which is usually included in the instrumentation of a ring-laser gyro, and it can be used directly in control law equation (1), i.e., $$u = -k[\overline{\omega_d} + \omega_L \overline{\sigma}] + D\omega_d \qquad (2)$$

where $$\overline{\sigma} = \sin \psi \qquad (3)$$

A block diagram of a system using $\overline{\sigma}$ instead of $\overline{\psi}$ as the feedback quantity is shown in FIG. 3 and a control unit for performing the necessary operations on the signals is described in connection with FIG. 4. It is a feature of this embodiment of the invention that it is not necessary to perform any non-linear operations in the control unit.

In the structure of FIG. 3, ring laser gyro spring suspension 40 is driven at angular rate $\omega_d$ to dither the ring laser gyro block 42. Ring laser gyro block 42 has an output electrical signal $\overline{\sigma}$, approximately equal to the sine of the optical angle $\psi$, which is fed to feedback control unit 46. As before, feedback control unit 46 is supplied with an electrical signal $\overline{\omega_d}$ from angular rate sensor 48 which represents the electrical equivalent of dither rate $\omega_d$. The output of feedback control unit 46 is a control signal c which is applied to torquer 48 for generating the angular acceleration u necessary for driving spring suspension 40.

Reference is made to FIG. 4 for the circuit of feedback control unit 46 which performs a function similar to that of the controller shown in equation 2. The input signal $\overline{\sigma}$ is multiplied by the lock-in frequency $\omega_L$ in amplifier 50, which is suitably scaled for this purpose, the output being fed to summing junction 52 where it is combined with the electrical signal $\overline{\omega_d}$ from angular rate sensor 48. The junction 52 can be the summing junction at the input of amplifier 54 which multiplies the sum produced at the junction by a gain factor k. Amplifier 54 may be an inverting operational amplifier like that of FIG. 2. It provides an output which is the negative of its input. The output of amplifier 54 is fed to summing junction 56 where it is combined with the output of amplifier 58, the product of dither angle rate signal $\overline{\omega_d}$ and D, the damping factor of the suspension system. The first signal input to summing junction 56 is, thus, the quantity $-k[\overline{\omega_d} + \omega_L \overline{\sigma}]$, and the second signal is $D\omega_d$, providing the two terms of equation (2). As was the case in the circuit of FIGS. 1 and 2, the output of summing junction 56 is passed as a voltage to torque amplifier 60 where, multiplied by the inverse of the torquer scale factor F, the output control signal c is generated for application to torquer 48.

The principle of operation of the invention can be explained with the aid of the differential equations that govern the behavior of the gyro and the suspension. The gyro output is given by the "Aronowitz equation":

$$\dot{\phi} = \omega + \omega_d + \omega_L \sin \psi \qquad (4)$$

where
$\psi = G(\phi + \chi)$
$\phi$ is the mechanical angle through which the gyro has been rotated,
$\beta$ is an arbitrary initial phase angle, and
G is the gyro scale factor.
The dither angle $\dot{\theta}_d$ satisfies $$\dot{\theta}_d = \omega_d \qquad (5)$$

with $$J\dot{\omega}_d + B\omega_d + K\theta_d = \tau \qquad (6)$$

where
J is the intertia of the block
B is the damping constant
K is the spring constant
$\tau$ is the torque supplied by the torquer.
Dividing both sides of (6) by J gives $$\dot{\omega}_d + D\omega_d + \Omega^2 \theta_d = u \qquad (7)$$

where
$D = B/J$
$\Omega = \sqrt{K/J}$ = natural frequency of the suspension
$\mu = \tau/J$ = angular acceleration produced by torquer.
Substitute into (7) the angular acceleration given by (1) to obtain $$\dot{\omega}_d + D\omega_d + \Omega^2 \theta_d = -k[\overline{\omega_d} + \omega_L \sin G(\overline{\phi} + \beta)] + D\overline{\omega_d} \qquad (8)$$

On the assumption that $\overline{\omega_d} \approx \omega_d$ and $\overline{\phi} \approx \phi$, the damping term $D\omega_d$ on the left hand side of (8) is cancelled by the corresponding term on the right and the result is $$\dot{\omega} + \Omega^2 \omega_d = -k[\omega_d + \omega_L \sin G(\phi + \beta)] \qquad (9)$$

Thus (4) becomes $$\dot{\phi} = \omega - (1/k)[\dot{\omega}_d + \Omega^2 \theta_d]$$

Thus the error, defined by $$\dot{e} = \dot{\phi} - \omega = -(1/k)[\dot{\omega}_d + \Omega^2 \theta_d] \qquad (10)$$

Both $\theta_d$ and $\dot{\omega}_d$ are bounded quantities, so the error $\dot{e}$ also remains bounded and does not grow with time.

Because of inexact realization of (1) and (2), there will be a small noise component added to the right hand side of (10) and $\dot{e}$ will contain a small random walk component. This random walk, however, can be expected to be much smaller than the random walk intentionally induced by adding random noise to the dither generator as described in U.S. Pat. No. 3,467,472.

It will be understood by those skilled in the art that, when the parameters of the gyroscope, the scale factor of the torquer, the damping factor of the suspension system, and the gyro scale factor are all precisely estimated, the lock-in effect is entirely eliminated. However, as a practical matter, some deviation of these parameters from their nominal values will occur and there will be some resulting error in the operation of the system. However, such errors as exist will be much smaller than those present in prior art systems.

It should also be noted that, although the present invention has been disclosed in terms of analog implementations, feedback control unit 12 of FIG. 1 could be equally well implemented digitally or in a hybrid analog/digital system. In such a case, it is only necessary that the readout quantity $\bar{\psi}$ from ring laser gyro block 4 or the readout quantity $\bar{\sigma}$ from ring laser block 42 can be converted to a digital value in an analog to digital converter, along with the angular rate readout $\bar{\omega}_d$, and both values fed to the microprocessor. The microprocessor would then be programmed to solve the equations (1) or (2), with the microprocessor output being then converted back into analog form through a digital to analog converter to provide the drive for torquer 14 or 48.

What is claimed is:

1. In combination with a spring-suspended ring laser gyroscope for providing a gyroscope readout which is proportional to angular input rate:
   a torquer,
   means for measuring the optical phase angle of the gyroscope and generating a signal proportional thereto,
   means for measuring the dither rate of the gyroscope and generating a signal proportinal thereto, and
   a feedback control unit for controlling the torquer to dither the gyroscope at a rate which is essentially equal to the lock-in characteristic of the gyroscope, the feedback control unit having as inputs the signals which are proportional to the gyro optical phase angle and to the dither rate.

2. The apparatus of claim 1 in which the angular acceleration u produced by the torquer is represented by the equation $$u = -k[\bar{\omega}_d + \omega_L \sin \bar{\psi}] + D\bar{\omega}_d$$

where
  D is the damping factor of the suspension system
  $\omega_L$ is the lock-in frequency
  k is a gain
  $\bar{\omega}_d$ is the measured dither rate
  $\bar{\psi}$ is the measured optical phase angle 3. The apparatus of claim 1 in which the angular acceleration u produced by the torquer is represented by the equation $$u = -k[\bar{\omega}_d + \omega_L \bar{\sigma}] + D\bar{\omega}_d$$

where
  $\bar{\sigma}$ is a signal representing the sine of the optical phase angle
  D is the damping factor of the suspension system
  $\omega_L$ is the lock-in frequency
  k is a gain
  $\bar{\omega}_d$ is the measured dither rate 4. Apparatus according to claim 1 in which the feedback control unit includes:
   (a) a sine function generator having the gyroscope phase angle signal as an input and providing an output proportional to the sine of its input;
   (b) a first amplifier having the output of the sine function generator as an input and multiplying the input by an angular rate corresponding to the lock-in frequency;
   (c) a summing junction having the output of the first multiplier as one input and the measured dither rate as another input;
   (d) a second amplifier for multiplying the output of the summing junction by a factor sufficient to minimize the residual lock-in effect and for inverting the product;
   (e) a third amplifier having the measured dither rate as an input and multiplying the input by an amount proportional to the gyro scale factor; and
   (f) a second summing junction having the outputs of the second and the third amplifiers as inputs.

5. Apparatus according to claim 1 in which the feedback control unit includes:
   (a) a first multiplier for multiplying an output signal of the gyroscope representing the sine of the optical angle by an angular rate corresponding to the lock-in frequency;
   (b) a first summing junction having as inputs the output of the first multiplier and the measured dither rate;
   (c) a second multiplier for multiplying the output of the first summing junction by a factor sufficient to minimize the residual lock-in effect and for inverting the product;
   (d) a third multiplier for multiplying the measured dither rate by an amount proportional to the gyro scale factor; and
   (e) a second summing junction having the outputs of the second and third multipliers as inputs.

* * * * *